Patented Jan. 31, 1933

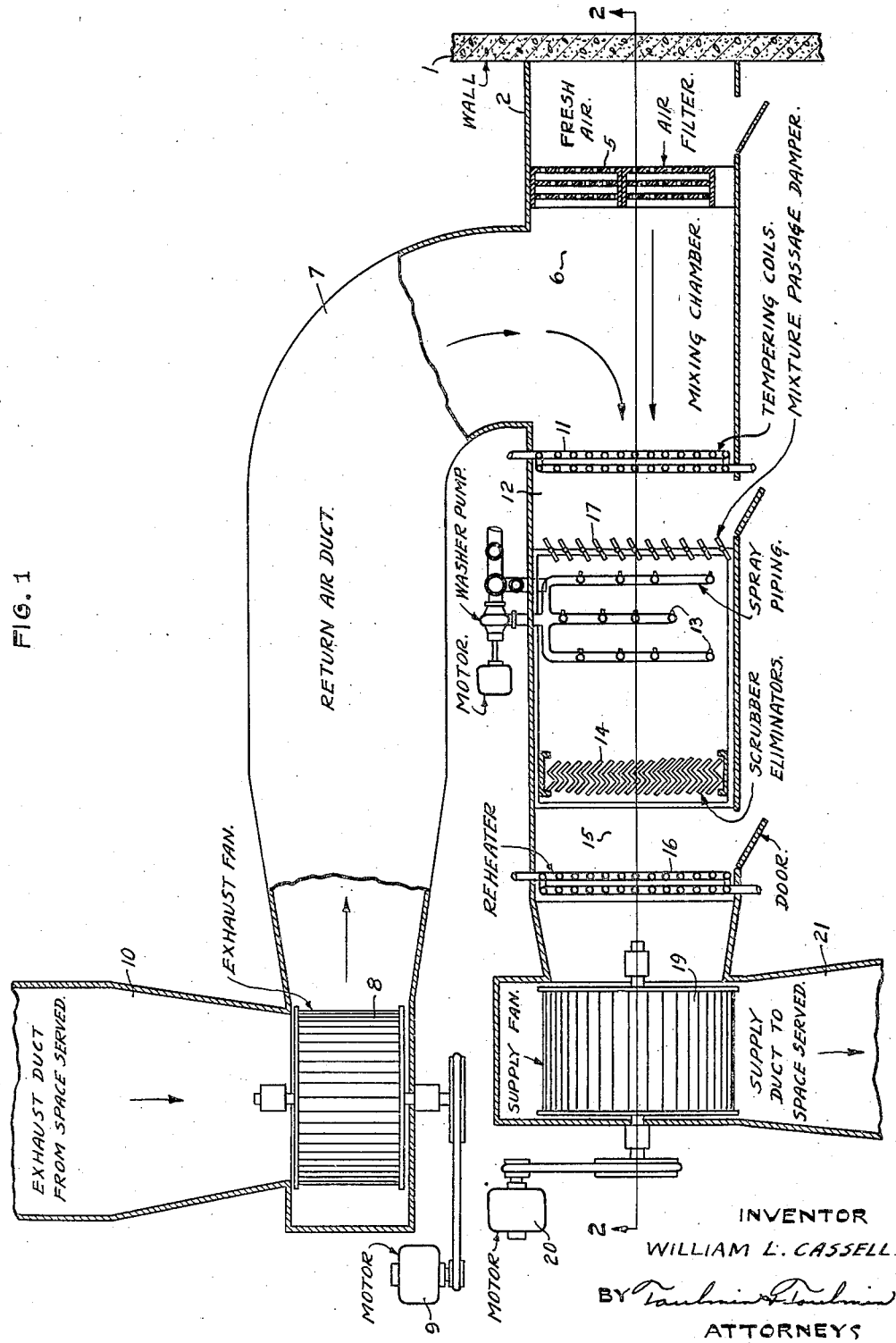

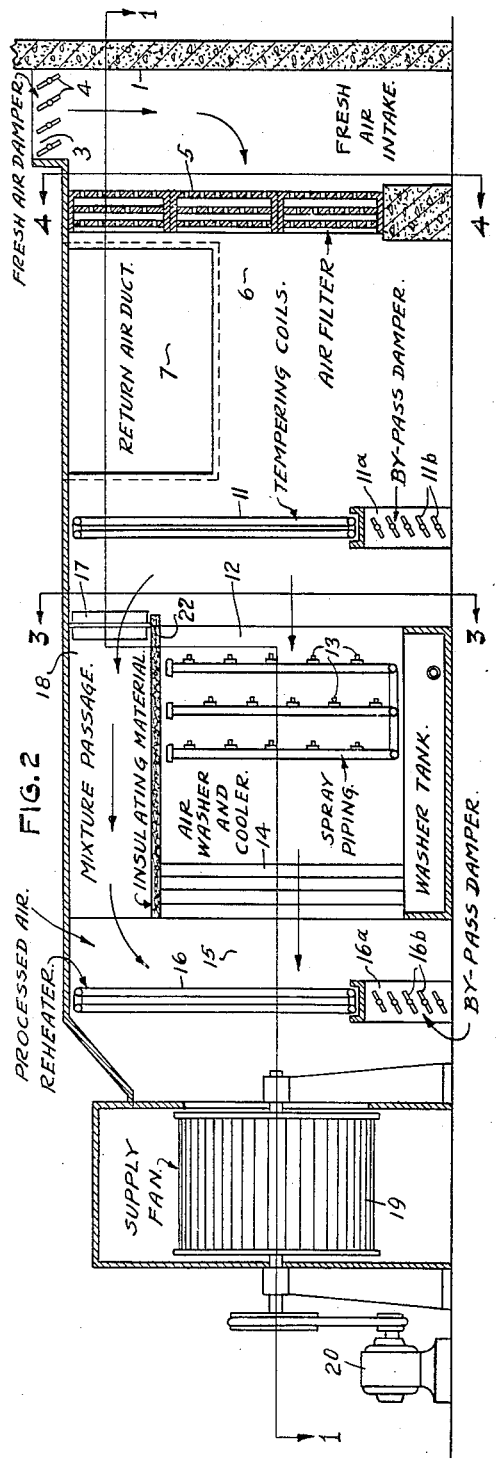
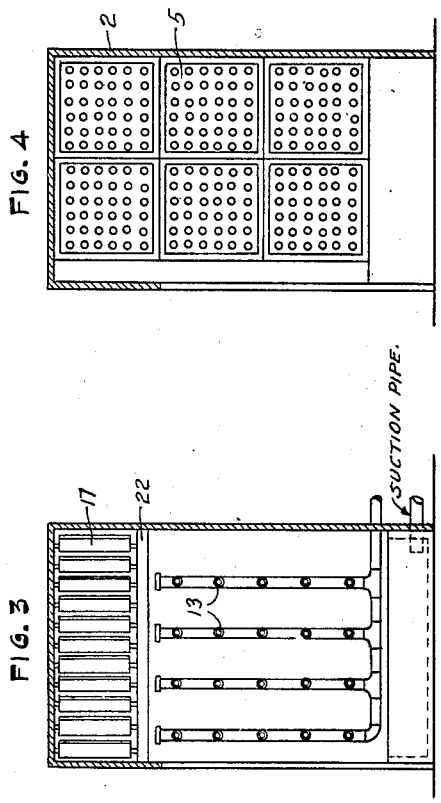

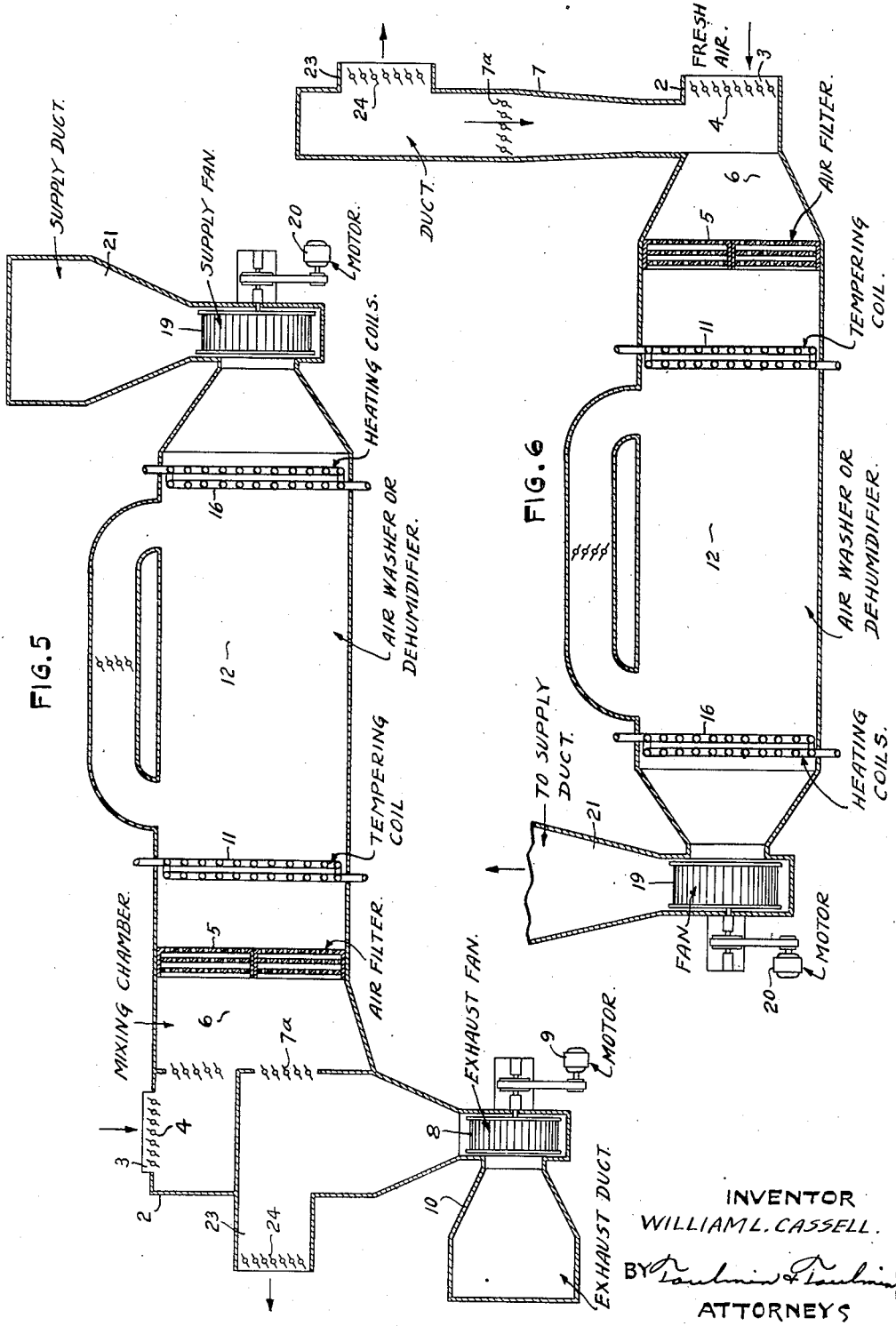

1,895,444

UNITED STATES PATENT OFFICE

WILLIAM L. CASSELL, OF KANSAS CITY, MISSOURI, ASSIGNOR TO AMERICAN BLOWER CORPORATION, OF DETROIT, MICHIGAN, A CORPORATION OF DELAWARE

HEATING, VENTILATING, AND AIR CONDITIONING

Application filed May 18, 1931. Serial No. 538,071.

My invention relates to heating, ventilating and air conditioning the contents of an enclosure.

It is the object of my invention to provide an apparatus for treating air that is circulated to and from the enclosure and to which a portion of fresh air is supplied and from which a portion of stale air is exhausted therefrom.

It is particularly my object to introduce fresh air into that part of the returned air which does not go through the cooler and which is used to mix with the processed air to raise its temperature to such a point that the mixture can be discharged into the space served at a comfortable temperature.

It is my object to provide an apparatus in which the fresh air is filtered before introduction into the system, then mixed with the return air, and thereafter a part of the mixture is air-washed and cooled becoming processed air, while the other part is by-passed around the air washer and cooler and then mixed with the processed air.

It is my object to provide an apparatus in which exhaust air from the enclosure may be partially exhausted to the outside of the enclosure and partially mixed with incoming fresh air, filtered, tempered and a part thereof by-passed around an air washer and dehumidifier and the other part air washed and dehumidified and then both parts reconsolidated, heated and returned to the enclosure.

Referring to the drawings:

Figure 1 is one form of an apparatus shown partially in section for the practice of my invention;

Figure 2 is a section on the line 2—2 thereof;

Figure 3 is a section on the line 3—3 of Figure 2;

Figure 4 is a section on the line 4—4 of Figure 2;

Figure 5 is a diagrammatic section showing the arrangement of my apparatus for carrying out the invention in one form;

Figure 6 is a similar section showing a modified arrangement.

Referring to the drawings in detail, 1 indicates the wall of a building partially broken away. A suitable air inlet opening is provided in this building communicating with the casing 2 through the opening 3 controlled by the dampers 4. The fresh air passes through a filter of any desired character indicated diagrammatically at 5 into the chamber 6 where it mixes with return air from the enclosure making its exit from the return air duct 7. This air is induced to make its return from the enclosure by the exhaust fan 8 operated through the motor 9. The passageway 10 communicates with the enclosure.

The combined fresh air and recirculated air from the enclosure are mixed together and passed over the tempering coils 11.

The air thence passes through two channels. It passes through the dehumidifier chamber 12 over the water sprays 13 through the water scrubbing plates 14 into the chamber 15 thence through the reheater coils 16. In the meanwhile the by-passed air, which has not been dehumidified, passes through the dampers 17 through the mixture passage 18 and mixes with the processed air in the chamber 15 and moves with it over the coils 16 being induced to do so by the fan 19 operated by the motor 20. The air so treated is returned to the enclosure through the supply duct 21.

It will be observed that a portion of the mixture of fresh and return air, to an extent determined by the setting of the damper 17, will not be dehumidified and will not be cooled.

This warmer air is, therefore, used to mix with the processed air to raise its temperature to such a point that the mixture can be discharged into the space being served at a comfortable temperature.

The introduction of the air filter to clean all of the air coming from the outside is so arranged that the return air does not pass through it, but, as all fresh air coming in must pass through it, all of the air in the enclosure is at one time or another properly filtered.

This arrangement lowers the cost of operation since only 20% of the amount of filter otherwise required needs to be installed. It also reduces the overall resistance on the system since the greatest resistance is on the air coming back through the return system, it not being necessary to pass through the filter all of the air so that the resistance in the system is kept at the minimum while at the same time including the advantage of filtering all of the air used.

By my invention, the proportion to the face area in relation to the volume of water handled as compared with the average cooler used heretofore in the air is so worked out as to produce a velocity of approximately 500 feet per minute through the air washer and cooler. A sufficient number of spray heads are installed to handle a large quantity of water per thousand cubic feet, thus permitting a moderate cooling range of the water as compared with a system where a smaller volume of water is used in proportion to the volume of air.

The further advantage of cooling the spray water through a small range, as registered in the operation of the refrigerating machine in that the compressor can run at a higher suction pressure, that is, a higher temperature than the refrigerant, which, in turn, effects a definite relative saving in horse-power per ton.

The mixture passage is so proportioned to allow the passage of the required volume of air at such a velocity, taking into account the resistance of the louvre damper as well as the loss due to the entrance of the chamber outlet so that the combined resistance of these various factors will just about equal the resistance through the cooler in which the principal loss is incurred by the air passing through the eliminators.

The bottom of the mixture passageway 18 is insulated as at 22 because the air passed through this passage is to be used as a heating medium to raise the temperature of the processed air which must be cooled to a lower degree to maintain the proper relative humidity. Consequently, the temperature of this air passing through this mixture passage has to be maintained at as high a temperature as possible under the existing conditions without allowing it to be cooled down by coming in contact with a cold surface, which would otherwise result if the insulation were not so placed between the cooling chamber and the mixture passage.

My system is capable in operation of mixing air from 90 per cent circulated air and 10 per cent fresh air to 80 per cent recirculated air and 20 per cent fresh air depending upon the contents of the enclosure which is being served by this apparatus. Either all fresh air or all recirculated air could be used.

A further feature of this mixture passageway is the more complete mixing of the fresh air and recirculated air as it passes through the relatively narrow restricted passageway on its way to the final mixture with the processed air before being reheated.

In the case of both the tempering coils 11 and the reheating coils 16, I have provided by-pass passageways 11a and 16a controlled by dampers 11b and 16b so as to regulate the temperature conditions.

In order to suitably exhaust the air that is to be discharged, I have provided an exhaust passageway 23 controlled by the dampers 24. The exhaust fan 8 may be utilized in this connection or a separate exhaust fan may be employed. If desired, dampers 7a may control the introduction of the recirculated air into the mixing chamber 6.

The form shown in Figure 6 is similar in principle to the other forms. In this form the passageway 7 has therein dampers by which the return air may be closed off and caused to be discharged through an outlet 23 adapted to be closed by dampers 24. The dampers 7a and 24 operate in conjunction with each other so that when one set of dampers is open the other is closed. These dampers also operate in conjunction with other dampers 4 for controlling the admission of fresh air.

It will be understood that I desire to comprehend within my invention such modifications as may be necessary to adapt it to varying conditions and uses.

Having thus fully described my invention, what I claim as new and desire to secure by Letters Patent is:

1. In an air conditioning system having an enclosure, means of withdrawing air from the enclosure, means of exhausting a portion of said air, means for filtering and introducing filtered air into the air withdrawn from the enclosure and mixing it therewith, means for tempering said mixed air, means of washing and cooling a portion of the mixed air, means of reheating the air, and means of returning it to the enclosure.

2. In an air conditioning system having an enclosure, means of withdrawing air from the enclosure, means of exhausting a portion of said air, means for filtering and introducing filtered air into the air withdrawn from the enclosure and mixing it therewith, means for tempering said mixed air, means of washing and cooling a portion of the mixed air, means of reheating the air, and means of returning it to the enclosure.

3. In an air conditioning system including an enclosure, a return air duct, an exhaust fan therein, a mixing chamber connected thereto, a fresh air inlet duct connected thereto, a filter in said mixing chamber, a tempering coil in said mixing chamber, a dehumidifier therebeyond, means for diverting a portion of the air around the dehumidifier, means for mixing the dehumidifier and diverted air, means for reheating the combined air, a supply fan, a supply duct for returning said air to the enclosure, and means comprising an exhaust duct associated with the first mentioned fan for exhausting a predetermined portion of the air to the exterior of the enclosure out of the system.

4. In combination, an enclosure, means for withdrawing air from the enclosure, means for introducing fresh air into the withdrawn air and mixing such air, means of dividing the mixed air into two streams, means for conveying one of said streams without conditioning, means for conditioning the other of said streams, means for mingling the unconditioned and conditioned streams, means of returning such streams to the enclosure, and insulating means between the stream being conditioned and the stream not being conditioned, and temperature modifying means located between said mixing means and said driving means for modifying the temperature of the mixed air after the same leaves the mixing means.

5. In combination, in an air conditioning system, of an enclosure, means of circulating air to and from the enclosure, means of introducing fresh air into the recirculated air after it leaves the enclosure, said fresh air and recirculated air being allowed to mix, means for tempering said mixed air, means for by-passing one part of the tempered, mixed air without conditioning, means of conditioning the other part of the tempered, mixed air, means of commingling the unconditioned and conditioned air, means of tempering said mixture and means of returning the air to the enclosure.

6. In combination, in an air conditioning system, an enclosure, means of withdrawing air from the enclosure, means of introducing and mixing fresh air with the withdrawn air, means of tempering a part of the mixed air, means of by-passing a part of the mixed air without tempering, means for remixing the air, means of by-passing a part of the remixed air and means of conditioning the part not by-passed, means of again mixing the air, means of tempering a part of the air so mixed and of by-passing the remainder, means of mixing the air for a fourth time and means of returning the air to the enclosure.

In testimony whereof, I affix my signature.

WILLIAM L. CASSELL.